(12) United States Patent
Tsuji et al.

(10) Patent No.: US 8,965,178 B2
(45) Date of Patent: Feb. 24, 2015

(54) PROGRAM INFORMATION DISPLAY DEVICE, PROGRAM INFORMATION OUTPUT DEVICE, AND PROGRAM INFORMATION DISPLAY METHOD

(71) Applicant: Panasonic Corporation, Osaka (JP)

(72) Inventors: Hisashi Tsuji, Fukuoka (JP); Atsuhiro Tsuji, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 68 days.

(21) Appl. No.: 13/940,204

(22) Filed: Jul. 11, 2013

(65) Prior Publication Data

US 2013/0322851 A1    Dec. 5, 2013

Related U.S. Application Data

(63) Continuation of application No. PCT/JP2012/008367, filed on Dec. 27, 2012.

(30) Foreign Application Priority Data

May 30, 2012    (JP) .................................. 2012-122731

(51) Int. Cl.
*H04N 9/80*    (2006.01)
*H04N 9/87*    (2006.01)
(Continued)

(52) U.S. Cl.
CPC . *H04N 9/87* (2013.01); *H04N 5/76* (2013.01); *H04N 5/765* (2013.01); *H04N 21/00* (2013.01)
USPC ........... 386/249; 386/239; 386/248; 386/250; 386/251

(58) Field of Classification Search
CPC ............ H04N 21/812; H04N 5/44543; H04N 7/17318; H04N 21/4331; H04N 21/44222

USPC .......................... 386/239, 248, 249, 250, 251
See application file for complete search history.

(56) References Cited

U.S. PATENT DOCUMENTS 7,712,123 B2    5/2010    Miyaoku et al.
7,712,125 B2    5/2010    Herigstad et al.
(Continued)

FOREIGN PATENT DOCUMENTS

JP    2002-027344 A    1/2002
JP    2002057956 A  *  2/2002    ............. H04N 5/445
(Continued)

OTHER PUBLICATIONS

Machine Translation of JP2002-057956, Suda Hidetaka, Feb. 22, 2002.*

(Continued)

*Primary Examiner* — Daquan Zhao
(74) *Attorney, Agent, or Firm* — McDermott Will & Emery LLP

(57) ABSTRACT

A program information display device includes: an identification unit which obtains identification information for identifying a video program and a video program scene included in the video program which are being displayed in a television; a program information obtainment unit which obtains program information including first program information and second program information which are relevant to the video program identified by the identification information and are different in content from each other; a display unit which displays the program information obtained by the program information obtainment unit; and a control unit which, in the case where the video program scene identified by the identification information transitions from a non-CM scene to a CM scene, switch the program information being displayed in the display unit, from the first program information to the second program information according to the transition from the non-CM scene to the CM scene.

18 Claims, 12 Drawing Sheets

(51) Int. Cl.
*H04N 5/76* (2006.01)
*H04N 5/765* (2006.01)
*H04N 21/00* (2011.01)

(56) References Cited

U.S. PATENT DOCUMENTS

| | | | |
|---|---|---|---|
| 2003/0001977 A1* | 1/2003 | Wang | 348/700 |
| 2003/0051252 A1 | 3/2003 | Miyaoku et al. | |
| 2005/0144637 A1 | 6/2005 | Shikata et al. | |
| 2005/0240981 A1 | 10/2005 | Nieminen | |
| 2005/0262548 A1 | 11/2005 | Shimojo et al. | |
| 2008/0199149 A1* | 8/2008 | Oh et al. | 386/83 |
| 2009/0091584 A1* | 4/2009 | Nishida | 345/660 |
| 2009/0154898 A1* | 6/2009 | Barrett et al. | 386/124 |
| 2011/0157475 A1* | 6/2011 | Wright et al. | 348/700 |

FOREIGN PATENT DOCUMENTS

| | | |
|---|---|---|
| JP | 2002-209204 A | 7/2002 |
| JP | 2003-234709 A | 8/2003 |
| JP | 2005-210686 A | 8/2005 |
| JP | 2006-005897 A | 1/2006 |
| JP | 2006-041573 A | 2/2006 |
| JP | 2009-290583 A | 12/2009 |
| JP | 2009-302877 | 12/2009 |

OTHER PUBLICATIONS

International Search Report issued in International Application No. PCT/JP2012/008367 with Date of mailing Jan. 29, 2013.

* cited by examiner

PROGRAM INFORMATION DISPLAY DEVICE, PROGRAM INFORMATION OUTPUT DEVICE, AND PROGRAM INFORMATION DISPLAY METHOD

CROSS REFERENCE TO RELATED APPLICATIONS

This is a continuation application of PCT International Application No. PCT/JP2012/008367 filed on Dec. 27, 2012, designating the United States of America, which is based on and claims priority of Japanese Patent Application No. 2012-122731 filed on May 30, 2012. The entire disclosures of the above-identified applications, including the specifications, drawings and claims are incorporated herein by reference in their entirety.

FIELD

One or more exemplary embodiments disclosed herein relate generally to a program information display device, a program information output device, and a program information display method.

BACKGROUND

There has been a program information display device which displays program information related to program content of a video program which is displayed in a video display device, such as a television, according to the program content of the video program (for example, Patent Literature 1).

CITATION LIST

Patent Literature

[Patent Literature 1] Japanese Unexamined Patent Application Publication No. 2002-209204

SUMMARY

Technical Problem

In many cases, a video program such as a television program is composed of program segments, commercial messages (CMs) inserted in the program segments, and so on. However, when the video program transitions from a program segment to CMs, the conventional technique does not sufficiently motivate a viewer to have the CMs continue to be displayed.

Thus, one non-limiting and exemplary embodiment provides a program information display device, a program information output device, and a program information display method which can let a viewer have CMs continue to be displayed even when the video program goes to a CM scene from a non-CM scene (a scene of a program segment).

Solution to Problem

In one general aspect, the techniques disclosed here feature a program information display device including: an identification unit configured to obtain identification information for identifying a video program and a video program scene included in the video program, the video program and the video program scene being displayed in a video display device; an obtainment unit configured to obtain program information including first program information and second program information which are relevant to the video program identified by the identification information and are different in content from each other; a display unit configured to display the program information obtained by the obtainment unit; and a control unit configured to, in the case where the video program scene identified by the identification information transitions from a scene other than a commercial message (a non-CM scene) to a scene of the commercial message (a CM scene), switch the program information being displayed in the display unit, from the first program information to the second program information according to the transition from the non-CM scene to the CM scene.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

A program information display device according to one or more exemplary embodiments or features disclosed herein can let a viewer have CMs continue to be displayed even when a video program transitions from a scene other than a commercial message (a non-CM scene) to a scene of the commercial message (a CM scene).

BRIEF DESCRIPTION OF DRAWINGS

These and other advantages and features will become apparent from the following description thereof taken in conjunction with the accompanying Drawings, by way of non-limiting examples of embodiments disclosed-herein.

DESCRIPTION OF EMBODIMENTS

The following describes details of embodiments with reference to the drawings as appropriate. However, there is a case where unnecessarily detailed descriptions are omitted. For example, there is a case where detailed descriptions on already well-known matters and overlapping explanations on substantially the same configurations are omitted. This is to prevent the following descriptions from being unnecessarily redundant and make it easier for a person skilled in the art to understand the following descriptions.

It is to be noted that the inventors provide the accompanying Drawings and the following descriptions so that a person skilled in the art sufficiently understands exemplary embodiments of the present disclosure, and therefore do not intend to limit the subject matter of the appended Claims and their equivalents.

Embodiment 1

With reference to FIGS. 1 to 8, Embodiment 1 is described below.

[1-1. Configuration]

Figure 1:
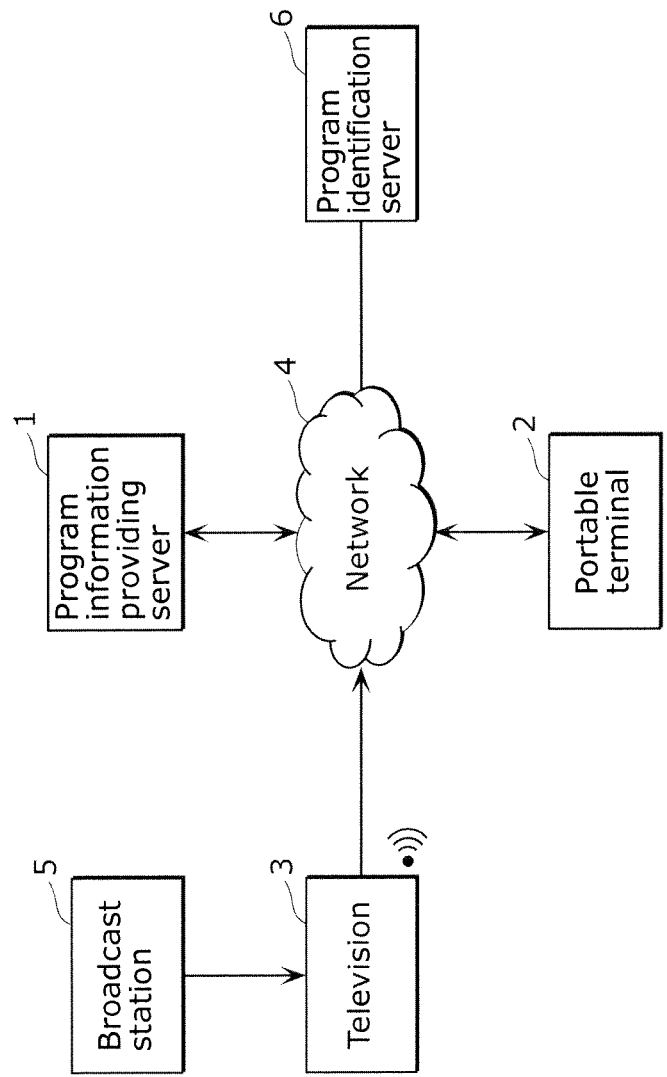
FIG. 1 shows a configuration example of a program-related information providing system according to Embodiment 1.
Figure 2A:
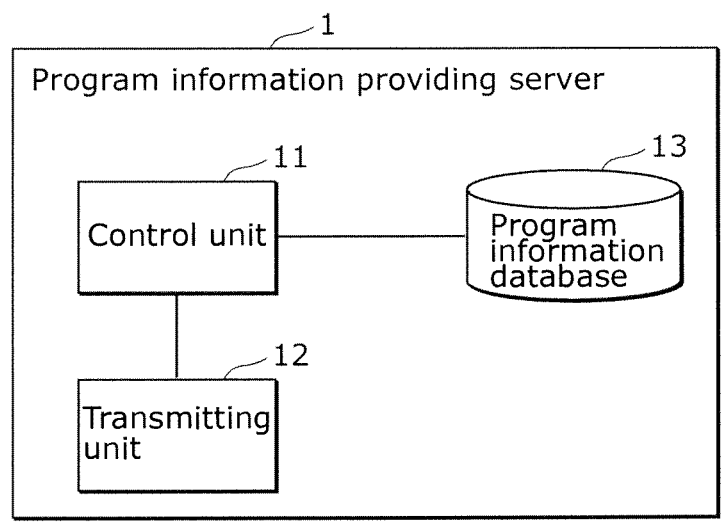
FIG. 2A is a block diagram showing a configuration of a program information providing server according to Embodiment 1.
Figure 2B:
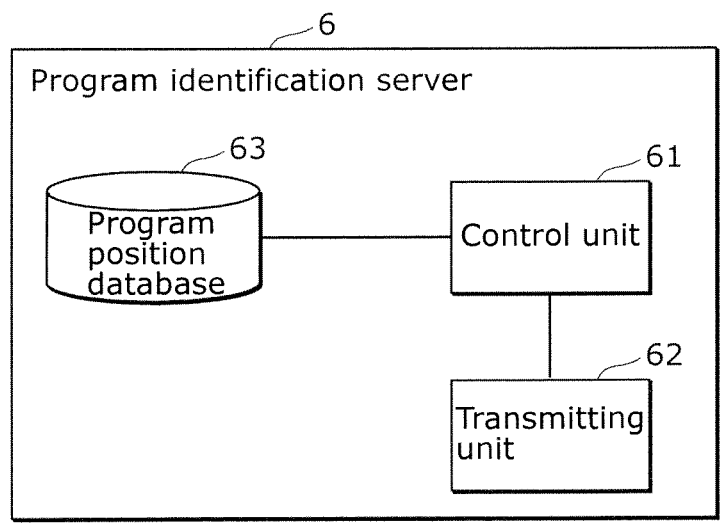
FIG. 2B is a block diagram showing a configuration of a program identification server according to Embodiment 1.
Figure 3:
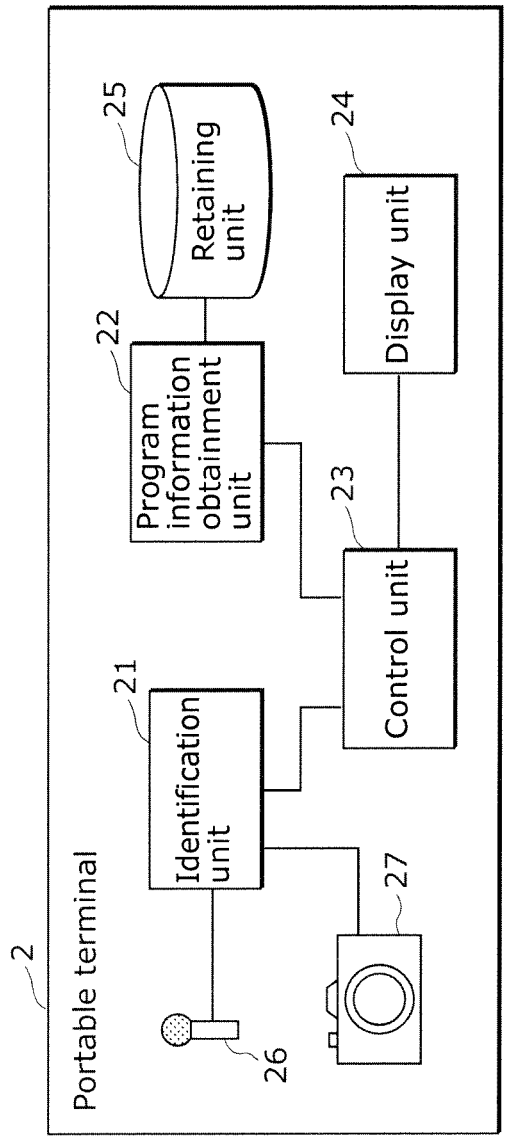
FIG. 3 is a block diagram showing a configuration of a portable terminal according to Embodiment 1.
Figure 4:
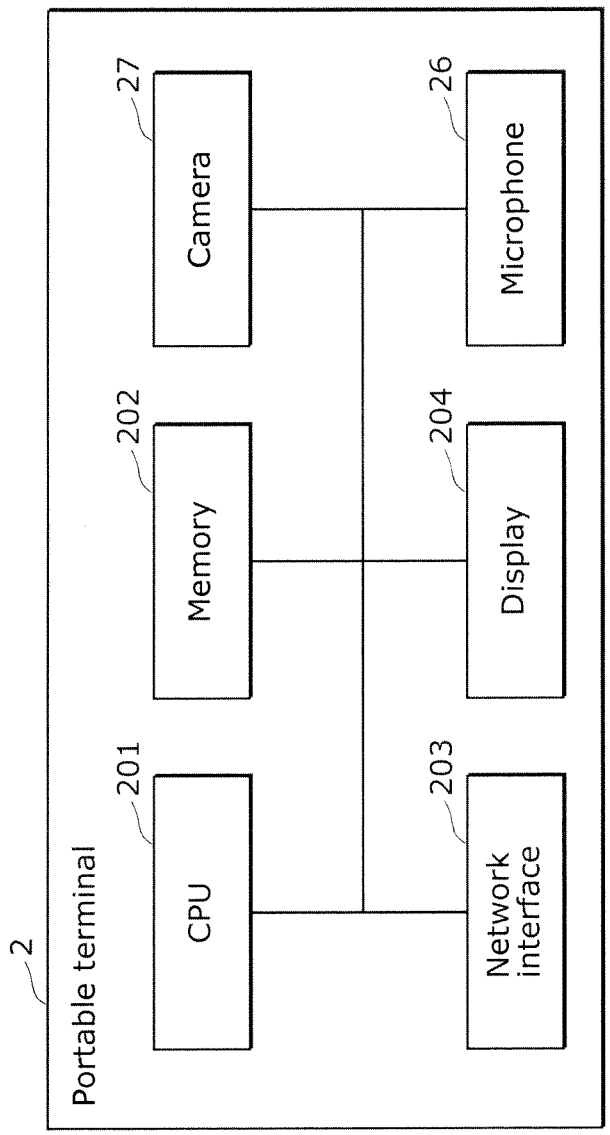
FIG. 4 shows an example of a hardware configuration of the portable terminal according to Embodiment 1.
Figure 5:
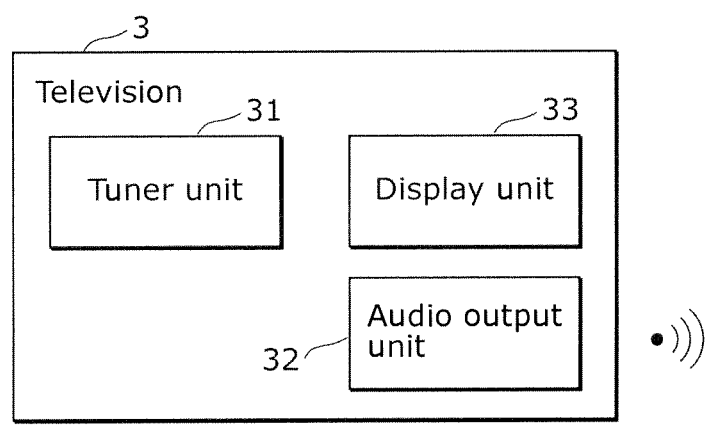
FIG. 5 is a block diagram showing a configuration of a television according to Embodiment 1.

FIG. 1 shows a configuration example of a program-related information providing system according to Embodiment 1. FIG. 2A is a block diagram showing a configuration of a program information providing server according to Embodiment 1. FIG. 2B is a block diagram showing a configuration of a program identification server according to Embodiment 1. FIG. 3 is a block diagram showing a configuration of a portable terminal according to Embodiment 1. FIG. 4 shows an example of a hardware configuration of the portable terminal according to Embodiment 1. FIG. 5 is a block diagram showing a configuration of a television according to Embodiment 1.

The program-related information providing system shown in FIG. 1 includes a program information providing server 1, a portable terminal 2, a television 3, a network 4, a broadcast station 5, and a program identification server 6.

The network 4 is a communication medium for connecting the program information providing server 1, the portable terminal 2, and the program identification server 6.

The broadcast station 5 is a distribution source which distributes (broadcasts) a video program to the television 3. In this embodiment, a broadcast station is cited as an example, which example is intended to be illustrative and not restrictive. Any which transmits a video program to the television 3 may be used such as not only the broadcast station, but also a wired distribution station including a cable television, a video-on-demand server, and a data transmitting device using an IP broadcast server, etc., in a computer network.

The program information providing server 1 provides program information relevant to a video program, such as content (referred to as program information) related to program content etc., of a television program which is broadcast, for example, based on identification information for identifying a scene included in the video program (also referred to as a program scene) which is being displayed in the television 3 or the like (scene information). In response to a providing request from the portable terminal 2, the program information providing server 1 provides the program information (content) corresponding to the video program.

Here, terms used hereinbelow are described.

"Program information (content)" is program information relevant to a video program, that is, information related to program content of the video program. For example, in the case where a human such as an actor/actress is displayed in video (a video program being displayed), the program information includes various information on this actor/actress (e.g., his or her profile such as birth date, sex, filmography, and acting carrier, and news related to the actor/actress). Furthermore, in the case where a commodity is displayed in the video program being displayed, for example, the program information includes information on the commodity (e.g., its manufacturer, sales agent, commodity price, URL for commodity introduction, and customer reviews on the commodity). Moreover, in the case where the video program being displayed is a news program, for example, the program information includes information on the news (e.g., information such as the outline of the news, the subject of the news, related news, and public reputations of the news). In short, the program information (content) means information on a displayed matter or a topic dealt with in the video program which is displayed in the television 3 or the like as well as indirect content related to such a matter or topic.

In this embodiment, the program identification information is described as including the broadcast station (video distribution source), a program name, a watching position within the program (e.g., elapsed time from the start of the video program), and broadcast day and time of the program (distribution day and time), which example is intended to be illustrative and not restrictive. The information may have other structures as long as it indentifies the program, a part of the program which is being watched, and so on.

"Identification information for identifying a program scene (scene information)" is information for identifying a scene included in a video program and typically is information which describes a scene included in the video program which is being displayed. For example, in the case where the video program being displayed is a drama, the scene information is various information on a scene of the drama (such as what the scene is like, whether the scene is a program segment or CM, how many seconds are left until the next scene, information such as scene ID, elapsed time from the beginning of the program, or absolute time during which the scene is displayed during broadcast).

In this embodiment, the scene information is described, for example, as including at least one of scene ID, a scene type (program segment or CM), a scene name, a scene starting point in time, and a scene ending point in time, which example is intended to be illustrative and not restrictive. The scene information may have other structures as long as it can identify a program scene.

Furthermore, the program information providing server 1 includes a control unit 11, a transmitting unit 12, and a program information database 13 as shown in FIG. 2A.

The control unit 11 controls the whole program information providing server 1 and provides control for transmission of the program information (content). Specifically, when receiving, from the portable terminal 2, identification information for identifying a video program, which includes information on the broadcast station and display day and time of the video program (program identification information), and identification information for identifying a program scene included in the video program (scene information), the control unit 11 provides control for transmission of program information (content) relevant (corresponding) to the program scene which is obtained from the program information database 13.

On the basis of the identification information (the program identification information and the scene information), the transmitting unit 12 transmits, to the portable terminal 2, the program information (content) obtained by the control unit 11 from the program information database 13.

The program information database 13 retains the program information (content) related to the video program identified by the identification information (the program identification information and the scene information).

The program identification server 6 provides the identification information for identifying the video program being displayed in the television 3 or the like (the program identification information) and the identification information for identifying a program scene included in the video program (the scene information). Specifically, in response to a request from the portable terminal 2 or the like, the program identification server 6 provides the identification information for identifying a program (the program identification information) and the identification information for identifying a program scene included in the video program (the scene information).

The program identification server 6 includes a control unit 61, a transmitting unit 62, and a program position database 63 as shown in FIG. 2B.

The control unit 61 controls the whole program identification server 6. Furthermore, on the basis of the video program displayed in the television 3, the control unit 61 obtains, from the program position database 63, the program identification information on the corresponding video program and the scene information etc., for identifying the program scene which indicates a position or the like within the video program.

In this embodiment, the control unit 61 obtains the program identification information from the program position database 63 based on data received via the transmitting unit 62, for example, video data or audio data of the video program which is displayed in the television 3. Furthermore, the control unit 61 obtains the scene information which indicates a position within the video program from the program position database 63 based on the data received via the transmitting unit 62, for example, the display day and time and the broadcast station or the video data or audio data of the video program which is displayed in the television 3. The control unit 61 then transmits the obtained identification information (the program identification information and the scene information) to the portable terminal 2 via the transmitting unit 62.

According to an instruction or the like from the control unit 61, the transmitting unit 62 receives information on the video program, such as audio etc., of the video program, from the portable terminal 2, and transmits, to the portable terminal 2, the identification information (such as the program identification information and the scene information) extracted from the program position database 63.

The program position database 63 retains, for example, the identification information for identifying program content of the video program broadcast from the broadcast station or the like (the program identification information) and the identification information which identifies a scene included in the video program (the scene information).

The portable terminal 2 is an example of a program information display device and receives program information (content) from the program information providing server 1 and displays the received program information (content) to a user.

In this embodiment, the portable terminal 2 first obtains the identification information (the program identification information and the scene information) using video or audio outputted from the television 3. In other words, the portable terminal 2 transmits the obtained video or audio to the program identification server 6 and thereby obtains the identification information for identifying the broadcast station and display day and time of the video program, a scene included in the video program which is being displayed, and so on. The portable terminal 2 then obtains the program information (content) using the identification information and presents (displays) the obtained program information (content) to a user. A specific description is provided below.

The portable terminal 2 includes an identification unit 21, a program information obtainment unit 22, a control unit 23, a display unit 24, a retaining unit 25, a microphone 26, and a camera 27 as shown in FIG. 3. Here, the portable terminal 2 may either be physically directly connected to the program information providing server 1 and the program identification server 6 via the network 4 or connected thereto with one or more devices interposed between the network 4 and each of the program information providing server 1 and the program identification server 6.

The identification unit 21 obtains the identification information (the program identification information and the scene information) for identifying the video program and a scene included in the video program which are being displayed in the television 3. Specifically, on the basis of the video or audio outputted from the television 3, the identification unit 21 asks the program identification server 6 about the program identification information such as the broadcast station (distribution source) of the video program which a viewer is watching on the television 3 and the display day and time of such video program. Here, a method of identifying a video program includes a method of generating data such as finger print information (finger print) from video or audio, for example, and transmitting the generated data to the program identification server 6 to ask the program identification server 6, which example is intended to be illustrative and not restrictive.

The program information obtainment unit 22 is an example of an obtainment unit, for example, and obtains program information that is relevant to a video program identified by the identification information and includes first program information and second program information which are different in content. Specifically, the program information obtainment unit 22 receives program information (content) from the program identification server 6 using the identification information (the program identification information and the scene information) identified by the identification unit 21.

Here, the program information obtainment unit 22 may be configured to obtain the program information including the second program information and cause the retaining unit 25 to retain the obtained second program information before a CM scene included in the video program is displayed in the television 3.

The video program includes a non-CM scene and a CM scene, and the non-CM scene is a scene of a program segment included in the video program. The first program information is program information that is related to program content of the non-CM scene included in the video program (normal content). The second program information is program information which is related to content of the non-CM scene included in the video program and is displayed in the display unit 24 for an interval during which the CM scene included in the video program is displayed in the television 3 (bonus content).

More specifically, the normal content (the first program information) is program information for program segment, and when the video program is a drama program, for example, the normal content is basic information on an actor or actress (name, birth data, and sex), a plot of a program segment (drama) of the video program, and so on. On the other hand, the bonus content (the first program information) is program information for a CM period, and when the video program is a drama program, for example, the bonus content is detailed information on an actor or actress (clothes which the actor or actress is wearing, other filmography, and news on the actor or actress), a side story of the program segment (drama), and so on. As another example, when the video program is a sports program, the normal content (the first program information) is a performance record of a batter, and so on, and the bonus content (the second program information) is information on benches during CM, information on substitution of players, and so on. It is to be noted that the normal content (the first program information) and the bonus content (the second program information) are not limited to the above examples.

The control unit 23 controls the whole portable terminal 2 and also controls the entire operation on obtainment, display, etc., of the program information. The control unit 23 then transmits the identification information (the program identification information and the scene information) obtained by the identification unit 21 to the program information providing server 1 via the program information obtainment unit 22. The control unit 23 records, into the retaining unit 25, the program information obtained using the identification information. Furthermore, the control unit 23 provides a control for displaying the obtained program information in the display unit 24.

Specifically, in the case where a video program scene identified by the identification information transitions from a scene other than a commercial message (a non-CM scene) to a scene of the commercial message (a CM scene), the control unit 23 switches the program information being displayed in the display unit 24, from the first program information to the second program information according to the transition from the non-CM scene to the CM scene.

For example, in the case where the video program scene identified by the identification information transitions from the non-CM scene to the CM scene, the control unit 23 may switch the program information being displayed in the display unit 24, from the first program information to the second program information immediately after the transition from the non-CM scene to the CM scene. Furthermore, for example, in the case where the video program scene identified by the identification information transitions from the non-CM scene to the CM scene, the control unit 23 may switch the program information being displayed in the display unit 24, from the first program information to the second program information immediately before the transition from the non-CM scene to the CM scene.

Furthermore, in the case where the video program scene identified by the identification information transitions from the CM scene to the non-CM scene, the control unit 23 further switches the program information being displayed in the display unit 24, from the second program information to the first program information according to the transition from the CM scene to the non-CM scene. Here, as in the above, in the case where the video program scene identified by the identification information transitions from the CM scene to the non-CM scene, the control unit 23 may switch the program information being displayed in the display unit 24, from the second program information to the first program information immediately after the transition from the CM scene to the non-CM scene. Furthermore, in the case where the video program scene identified by the identification information transitions from the CM scene to the non-CM scene, the control unit 23 may switch the program information being displayed in the display unit 24, from the second program information to the first program information immediately before the transition from the CM scene to the non-CM scene.

It is to be noted that, in the case where the program information including the second program information (the second program information) is retained in the retaining unit 25 before the CM scene included in the video program is displayed in the television 3, the control unit 23 may switch, according to the transition from the non-CM scene to the CM scene, the program information being displayed in the display unit 24, from the first program information to the second program information retained by the retaining unit 25.

The display unit 24 displays the program information obtained by the program information obtainment unit 22, for example. Furthermore, the display unit 24 displays not only the program information, but also scene information which became a target to be displayed, for example.

The retaining unit 25 retains at least the second program information. Furthermore, the retaining unit 25 may retain the obtained scene information and program information.

Here, for example, the retaining unit 25 retains the program information including the second program information and obtained by the program information obtainment unit 22 (the second program information) before the CM scene included in the video program is displayed in the television 3.

The microphone 26 obtains audio outputted together with video of the video program displayed in the television 3.

The camera 27 obtains video of the video program displayed in the television 3.

In the description on this embodiment, the portable terminal 2 includes both the microphone 26 and the camera 27, which example is intended to be illustrative and not restrictive. The portable terminal 2 may include only one of the microphone 26 and the camera 27. This means that the microphone 26 and the camera 27 are each given as an example of a device for obtaining the identification information for identifying the video program which is displayed in the television 3 (the program identification information). Therefore, a usable device is not limited to those mentioned above; other than those, any device capable of obtaining the identification information for identifying the video program which is displayed in the television 3 can be used.

The portable terminal 2 configured as above is implemented using hardware shown in FIG. 4, for example. Specifically, the portable terminal 2 is implemented in a hardware configuration which includes, as shown in FIG. 4, for example, a central processing unit (CPU) 201, a memory 202, a network interface 203, a display 204, the microphone 26, and the camera 27.

The CPU 201 controls the whole portable terminal 2. Specifically, a part which provides such control is implemented using a software program which operates on the CPU 201, for example. The CPU 201 corresponds, for example, to part of the identification unit 21, part of the program information obtainment unit 22, or the control unit 23 shown in FIG. 3.

The memory 202 records data. The memory 202 records the above-mentioned software program which operates on the CPU 201, a temporary variable for use in operating the software program, the scene information obtained from the program identification server 6, the program information (content) obtained from the program information providing server 1, and so on. It is to be noted that the memory 202 corresponds, for example, to the retaining unit 25 shown in FIG. 3.

The network interface 203 transmits and receives data to and from an external device connected thereto via a network. A conceivable connection state for use in transmitting and receiving data to and from the external device is wireless connection, wired connection, or the like, which example is intended to be illustrative and not restrictive. It is to be noted that the network interface 203 corresponds, for example, to part of the identification unit 21 or part of the program information obtainment unit 22 shown in FIG. 3.

The display 204 is a display device which displays the obtained program information (content) and so on. The display 204 corresponds to the display unit 24 shown in FIG. 3.

The microphone 26 is a device which obtains audio from the television 3 as described above.

The camera 27 captures images of video displayed in the television 3. The camera 27 corresponds to the camera 27 shown in FIG. 3.

The television 3 is an example of a video display device and is a device for enabling a user of the portable terminal 2 to watch a video program.

A viewer of the television 3 watches, on the television 3, a video program distributed from the broadcast station 5 shown in FIG. 1, for example. At this time, the portable terminal 2 placed beside the viewer when the viewer is watching the television 3 obtains audio outputted from the television 3. On the basis of this audio, the portable terminal 2 is capable of obtaining, from the program identification server 6, the identification information for identifying the video program which is being watched (the program identification information) and the identification information for identifying the scene included in the video program which is being watched (the scene information). Thus, the portable terminal 2 is capable of obtaining and displaying the program information based on the identification information. Consequently, the viewer can obtain, through the portable terminal 2, detailed program information on program content in which the viewer is interested within the video program which is displayed in the television 3.

The television 3 includes, as shown in FIG. 5, a tuner unit 31, an audio output unit 32, and a display unit 33.

The tuner unit 31 receives, demodulates, and converts the video program distributed from the broadcast station 5 so that the audio output unit 32 can output audio and the display unit 33 can display video.

The audio output unit 32 outputs the audio obtained through the demodulation by the tuner unit 31.

The display unit 33 displays the video program obtained through the demodulation by the tuner unit 31.

In the case where the video program transitions from a non-CM scene (a scene of a program segment) to a CM scene, the program-related information providing system configured as above is capable of causing the display unit 24 of the portable terminal 2 to display bonus content (the second program information) upon the transition. This makes it possible to continue to display the CM to the viewer (i.e., possible to let the viewer continue to watch the CM) even when the video program transitions fro a non-CM scene (a scene of the program segment) to a CM scene.

[1-2. Operation]

Each operation of the program-related information providing system configured as above is described in detail below.

Figure 6:
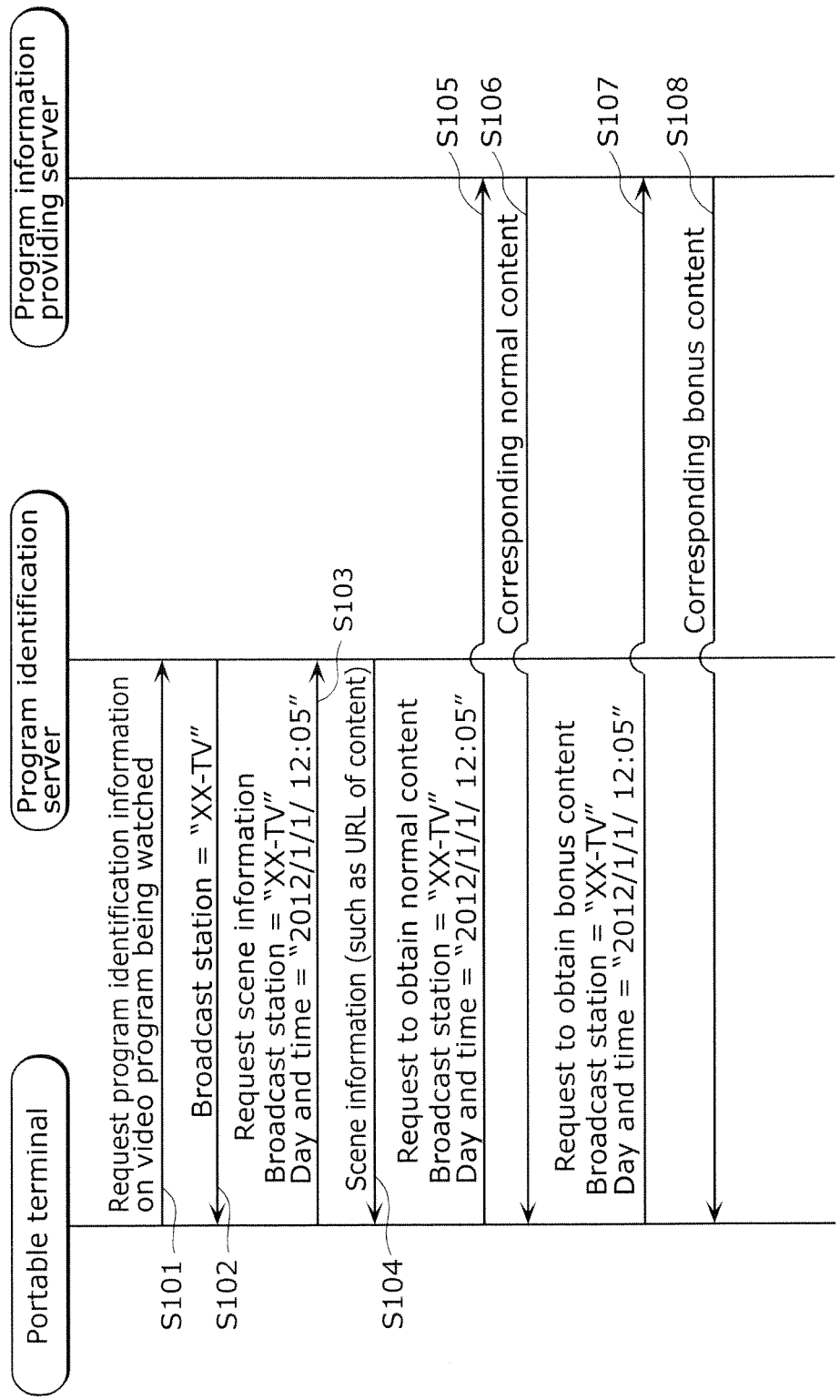
FIG. 6 is a sequence chart showing a flow of processing between the program information providing server, the portable terminal, and the program identification server which are included in the program-related information providing system according to Embodiment 1.

FIG. 6 is a sequence chart showing a flow of processing between the program information providing server 1, the portable terminal 2, and the program identification server 6 which are included in the program-related information providing system according to Embodiment 1.

Firstly, the portable terminal 2 (the identification unit 21) makes a request to the program identification server 6 for the identification information for identifying a video program which is being watched (the program identification information) (S101). Specifically, the portable terminal 2 transmits data of the audio or video of the video program obtained by the microphone 26 or the camera 27.

Next, the program identification server 6 (the control unit 61) compares the obtained data with data stored in the program position database 63 and identifies the video program which is being watched (i.e., obtains the program identification information for identifying the video program). The program identification server 6 (the transmitting unit 62) transmits the obtained program identification information to the portable terminal 2 (S102).

Next, the portable terminal 2 (the control unit 23) makes a request to the program identification server 6 for the identification information for identifying a scene included in the video program which is being watched (the scene information) (S103). Here, the portable terminal 2 (the control unit 23) makes a request for the scene information by transmitting data including the broadcast station, the display day and time, and so on. In addition, upon making the request, the portable terminal 2 (the control unit 23) simultaneously transmits the program identification information obtained in S102.

Next, on the basis of the received data including the broadcast station, the display day and time, and so on, of the video program, for example, the program identification server 6 (the control unit 61) searches the program position database 63 for the scene information for identifying a scene included in the corresponding video program and obtains the scene information. The program identification server 6 (the transmitting unit 12) then transmits the obtained program scene information to the portable terminal 2 (S104).

The following description is given assuming that a scene included in the video program which is currently being watched by a user is a scene of the program segment.

Next, the portable terminal 2 (the program information obtainment unit 22) makes an obtainment request to the program information providing server 1 for the normal content (the first program information) by using the identification information (the program identification information and the scene information) obtained by the identification unit 21 (S105). Here, upon making the obtainment request, the portable terminal 2 (the program information obtainment unit 22) simultaneously transmits the program identification information.

Next, on the basis of the broadcast station which distributes a video program and the display day and time of the distributed video program both of which are included in the received program identification information, the program information providing server 1 (the control unit 11) searches the program information database 13 for the normal content (the first program information) corresponding to the program segment of the corresponding video program, and obtains the normal content (the first program information). The program information providing server 1 (the transmitting unit 12) then transmits the obtained normal content (the first program information) to the portable terminal 2 (S106).

Next, the portable terminal 2 (the program information obtainment unit 22) makes an obtainment request to the program information providing server 1 for the bonus content (the second program information) to be displayed during the CM (S107). Here, upon making the obtainment request, the portable terminal 2 (the program information obtainment unit 22) simultaneously transmits the program identification information.

Next, on the basis of the broadcast station which distributes a video program and the display day and time of the distributed video program both of which are included in the received program identification information, the program information providing server 1 (the control unit 11) searches the program information database 13 for the bonus content (the second program information) corresponding to the CM period of the video program, and obtains the bonus content (the second program information). The program information providing server 1 (the transmitting unit 12) then transmits the obtained bonus content (the second program information) to the portable terminal 2 (S108).

The portable terminal 2 (the display unit 24) then displays the obtained program information (the normal content or the bonus content) according to a scene (a scene of the program segment or a CM scene) included in the video program which is displayed in the television 3.

Next, the operation in the portable terminal 2 is described.

Figure 7:
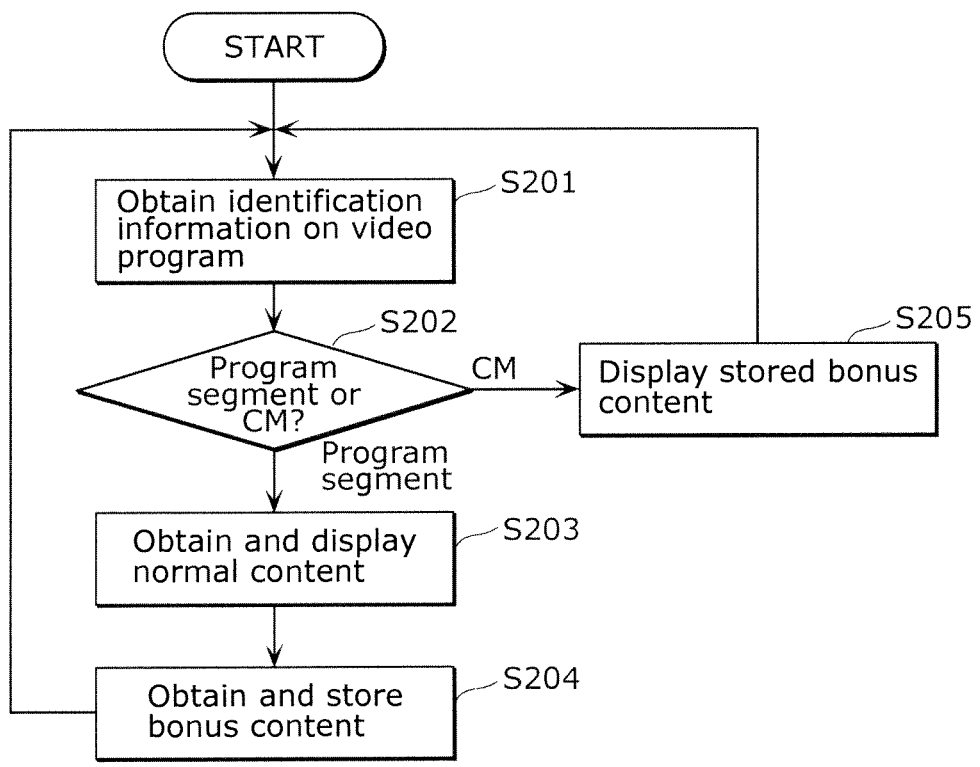
FIG. 7 is a flowchart for explaining the operation of the portable terminal according to Embodiment 1.
Figure 8:
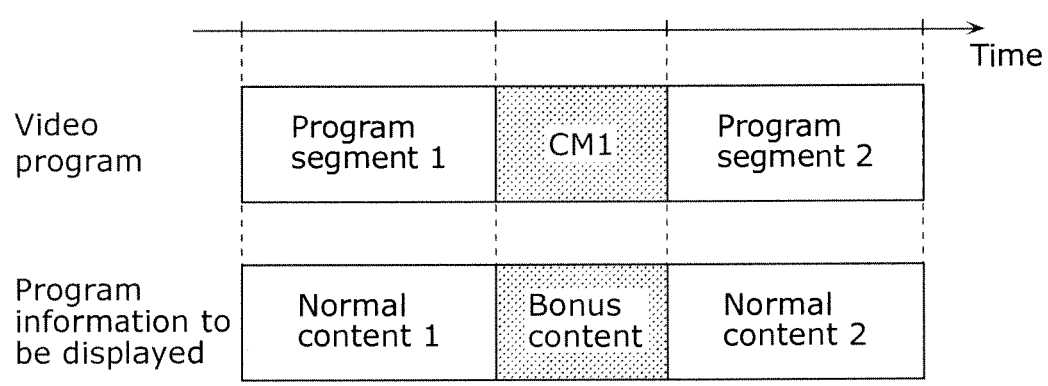
FIG. 8 shows an example of timing for transitions of scenes within a video program which is being watched by a user and transitions of program information which is displayed.

FIG. 7 is a flowchart for explaining the operation of the portable terminal 2 according to Embodiment 1. FIG. 8 shows an example of timing for transitions of the scenes included in the video program which is being watched by a user and transitions of the program information which is displayed.

Firstly, in response to an instruction from the control unit 23, the identification unit 21 obtains, through the microphone 26 and the camera 27, audio or video outputted from the television 3. Next, the identification unit 21 obtains, from the program identification server 6, the identification information for identifying the video program which is currently being watched by a user and a scene included in the video program (the program identification information and the scene information) (S201). Specifically, the identification unit 21 transmits, to the program identification server 6, data of the audio or video of the video program obtained by the microphone 26 or the camera 27. The identification unit 21 then receives the identification information (the program identification information and the scene information) as a response from the program identification server 6. Processing of obtaining the identification information by the identification unit 21 is as described in S101 to S104 and therefore is not described here in detail.

Next, the control unit 23 determines based on the obtained scene information whether the scene included in the video program which is being displayed in the television 3 is a scene of the program segment or a CM scene (S202).

Here, assume, for example, that the scene information includes a scene type, etc., for distinguishing a program segment of the video program and a commercial message (CM) of the video program. In the case shown in FIG. 8, the scene information includes a scene type indicating a program segment 1 or 2 of the video program or a scene type indicating a CM inserted between the program segment 1 and the program segment 2. With this, the control unit 23 can determine based on the obtained scene information whether the scene included in the video program which is being displayed in the television 3 is a scene of the program segment or a CM scene.

Next, the scene included in the video program which is being displayed in the television 3 is determined to be the program segment (e.g., the program segment 1) (the program segment in S202), the control unit 23 causes the program information obtainment unit 22 to obtain the normal content (the first program information) within the program segment 1 of the video program. The control unit 23 then causes the display unit 24 to display the obtained normal content (the first program information) (S203). Processing of obtaining the normal content (the first program information) by the portable terminal 2 is as described in S105 and S106 and therefore is not described here in detail.

Next, while the scene included in the video program which is being displayed in the television 3 is the program segment (e.g., the program segment 1), the control unit 23 causes the program information obtainment unit 22 to obtain the bonus content (the second program information) to be displayed in the display unit 24 during the CM of the video program (CM1 inserted between the program segment 1 and the program segment 2 in FIG. 8). The control unit 23 then causes the program information obtainment unit 22 to store (retain) the obtained bonus content (the second program information) in the retaining unit 25 (S204). Processing of obtaining the bonus content (the second program information) by the portable terminal 2 is as described in S107 and S108 and therefore is not described here in detail.

On the other hand, in the case where the scene included in the video program which is being displayed in the television 3 is determined to be the CM (e.g., CM1 in FIG. 8) in S202, the control unit 23 causes the display unit 24 to display the bonus content (the second program information) retained in the retaining unit 25 (S205).

In the case where the scene included in the video program which is being displayed in the television 3 is the program segment, the processing from S201 to S204 is repeated, and in the case where the scene included in the video program which is being displayed in the television 3 is the CM, the processing from S201 to S205 is repeated.

Thus, the normal content (the first program information) is displayed in the display unit 24 of the portable terminal 2 in the case where the identified program scene is the program segment. On the other hand, the bonus content (the second program information) is displayed in the display unit 24 of the portable terminal 2 only in the case where the identified program scene is the CM.

[1-3. Advantageous Effect, Etc.]

As above, the program information display device (the portable terminal 2) according to this embodiment includes: an identification unit (the identification unit 21) configured to obtain identification information (the program identification information and the scene information) for identifying a video program and a video program scene included in the video program, the video program and the video program scene being displayed in a video display device (the television 3); an obtainment unit (the program information obtainment unit 22) configured to obtain program information including first program information (the normal content) and second program information (the bonus content) which are relevant to the video program identified by the identification information (the program identification information and the scene information) and are different in content from each other; a display unit (the display unit 24) configured to display the program information (the content) obtained by the obtainment unit (the program information obtainment unit 22); and a control unit (the control unit 23) configured to, in the case where the video program scene identified by the identification information (the program identification information and the scene information) transitions from a non-CM scene (the program segment) to a scene of the CM, switch the program information (the content) being displayed in the display unit (the display unit 24), from the first program information (the normal content) to the second program information (the bonus content) according to the transition from the non-CM scene (the program segment) to the CM scene.

With this structure, it is possible to continue to display the CM to a viewer even when the video program transitions from a non-CM scene (a program segment) to a CM scene.

Here, it may be that, in the case where the video program scene identified by the identification information (the program identification information and the scene information) transitions from the non-CM scene (the program segment) to the CM scene, the control unit (the control unit 23) is configured to switch the program information (the content) being displayed in the display unit (the display unit 24), from the first program information (the normal content) to the second program information (the bonus content) immediately after the transition from the non-CM scene (the program segment) to the CM scene.

Furthermore, it may be that, in the case where the video program scene identified by the identification information (the program identification information and the scene information) transitions from the non-CM scene (the program segment) to the CM scene, the control unit (the control unit 23) is configured to switch the program information (the content) being displayed in the display unit (the display unit 24), from the first program information (the normal content) to the second program information (the bonus content) immediately before the transition from the non-CM scene (the program segment) to the CM scene.

Furthermore, it may be that, in the case where the video program scene identified by the identification information (the program identification information and the scene information) transitions from the CM scene to the non-CM scene (the program segment), the control unit (the control unit 23) is further configured to switch the program information (the content) being displayed in the display unit (the display unit 24), from the second program information (the bonus content) to the first program information (the normal content) according to the transition from the CM scene to the non-CM scene (the program segment).

Furthermore, it may be that, in the case where the video program scene identified by the identification information (the program identification information and the scene information) transitions from the CM scene to the non-CM scene (the program segment), the control unit (the control unit 23) is configured to switch the program information (the content) being displayed in the display unit (the display unit 24), from the second program information (the bonus content) to the first program information (the normal content) immediately after the transition from the CM scene to the non-CM scene (the program segment).

Furthermore, it may be that, in the case where the video program scene identified by the identification information (the program identification information and the scene information) transitions from the CM scene to the non-CM scene (the program segment), the control unit (the control unit 23) is configured to switch the program information (the content) being displayed in the display unit (the display unit 24), from the second program information (the bonus content) to the first program information (the normal content) immediately before the transition from the CM scene to the non-CM scene (the program segment).

With this, the program information display device is capable of displaying preferable program information according to a scene (a scene of the program segment or a CM scene) of the video program which is displayed in the video display device. For example, in the case where the program information display device is displaying a scene of the program segment of the video program, the program information display device displays the program information corresponding to the scene of the program segment (the first program information) and also obtains the program information which is to be displayed in the display unit of the program information display device when the program information display device displays a CM scene of the video program (the second program information). When the program information display device displays the CM scene of the video program, then the program information display device displays the program information corresponding to the CM scene (the second program information).

Thus, even when the video program transitions to the CM period, a viewer can view, on the program information display device, the program information corresponding to the video program (the second program information). This allows the viewer to be motivated to view the program information related to the video program even while a CM irrelevant to the program segment of the video program is being displayed, which means that it is possible to continue to display the CM to the viewer.

Furthermore, the program information display device (the portable terminal 2) according to this embodiment further includes a retaining unit (the retaining unit 25) configured to retain at least the second program information (the bonus content), and the obtainment unit (the program information obtainment unit 22) is configured to obtain the program information (the content) including the second program information (the bonus content) and cause the retaining unit (the retaining unit 25) to retain the obtained second program information (the bonus content) before the CM scene included in the video program is displayed in the video display device (the television 3). It may be that the control unit (the control unit 23) is configured to switch, according to the transition from the non-CM scene (the program segment) to the CM scene, the program information being displayed in the display unit (the display unit 24), from the first program information (the normal content) to the second program information (the bonus content) retained by the retaining unit (the retaining unit 25).

With this, it is possible to switch the program information according to the transition of the video program from the non-CM scene (the program segment) to the CM scene of the video program.

In this embodiment, as a method of identifying the video program, an approach of asking the program identification server 6 based on data of the video or audio obtained by the portable terminal 2 is used, which example is intended to be illustrative and not restrictive. It may also be possible to identify the video program, for example, through an approach of embedding information into the video or audio of the video program which is broadcast by the broadcast station 5, e.g., by using the watermark technology.

Furthermore, in the description on this embodiment, the program identification server 6 is asked about the identification information (the program identification information and the scene information), which example is intended to be illustrative and not restrictive. It may also be possible that the program identification server 6 is asked about the program identification information only and the program information providing server 1 is asked about the scene information out of the identification information.

It is also conceivable that the obtained URL is stored into the scene information when the bonus content (the second program information) is obtained from the program identification server 6. In this case, it is possible to create a situation in which only the viewer who watched the program segment before the CM is allowed to obtain the bonus content (the second program information).

In the structure described in this embodiment, the bonus content (the second program information) is obtained during the program segment and retained in the retaining unit 25 included in the portable terminal 2, which example is intended to be illustrative and not restrictive. It may also be possible, for example, that the obtained URL, etc., of the bonus content (the second program information) is retained in the retaining unit 25 while the program segment is being watched and at a point in time when the program scene transitions to the CM, the bonus content (the second program information) is obtained from the retaining unit 25 and is displayed. It may also be possible, for example, that, after the program scene transitions to the CM (during the CM), the bonus content (the second program information) is obtained and displayed.

Furthermore, the description on this embodiment illustrates an example in the case where the normal content for program segment (the first program information) and the bonus content for CM (the second program information) are obtained through different processes, i.e., in S105 and S106 and in S107 and S108, respectively, in FIG. 6, which example is intended to be illustrative and not restrictive. It may also be possible, for example, to obtain the normal content (the first program information) and the bonus content (the second program information) in the same step. In this case, an advantageous effect is produced; the volume of communication between the portable terminal 2 and the program information providing server 1 or the number of times the communication occurs therebetween can be reduced.

Embodiment 2

An example different from the program-related information providing system described in Embodiment 1 is described below with reference to FIGS. 9 to 12 as Embodiment 2.

[2-1. Configuration]

Figure 9:
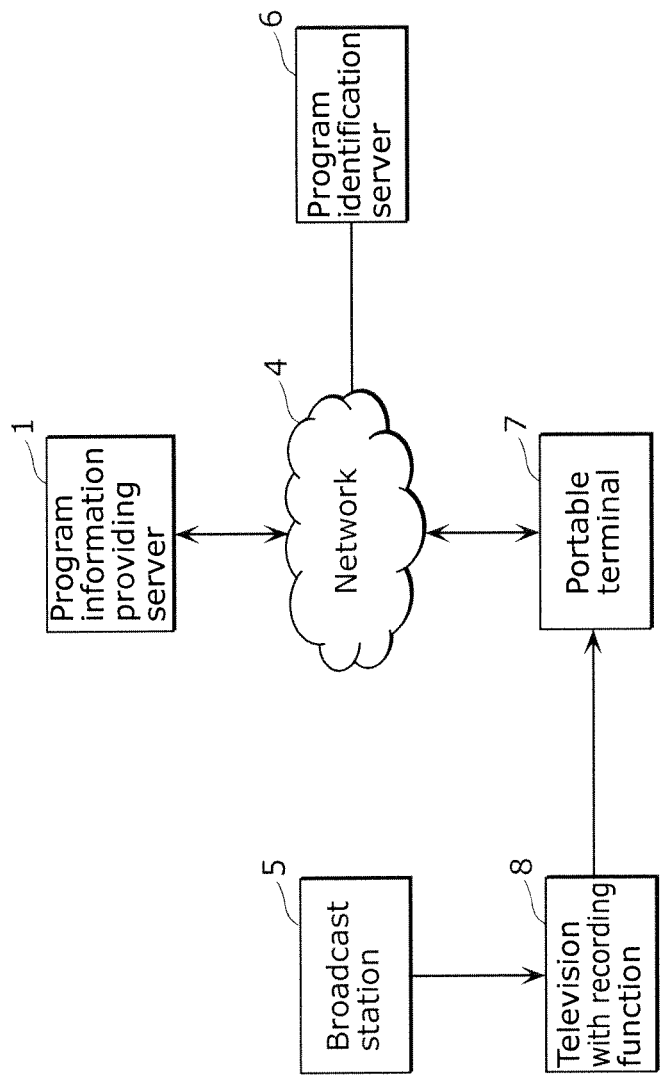
FIG. 9 shows a configuration example of a program-related information providing system according to Embodiment 2.
Figure 10:
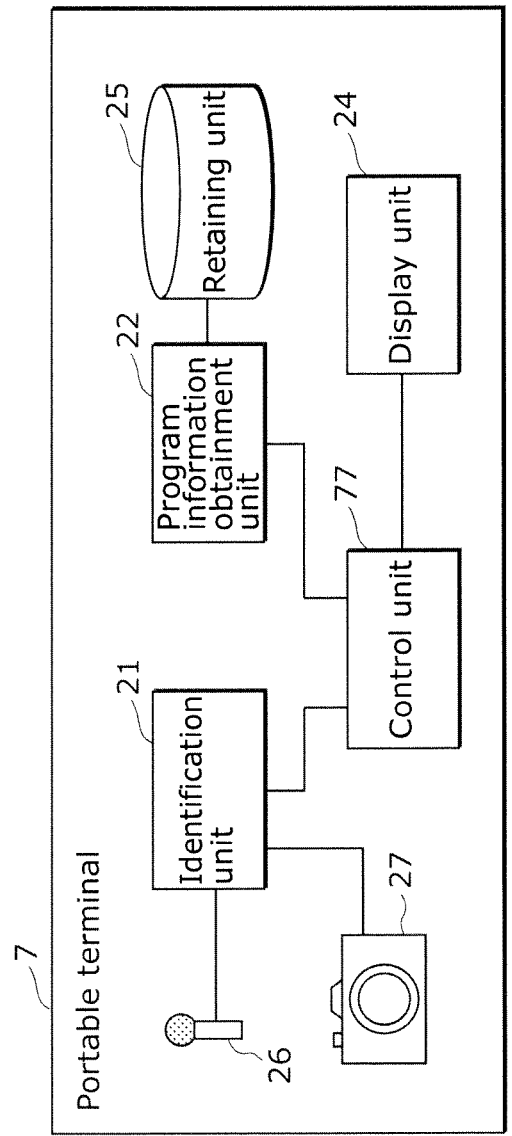
FIG. 10 is a block diagram showing a configuration of a portable terminal according to Embodiment 2.
Figure 11:
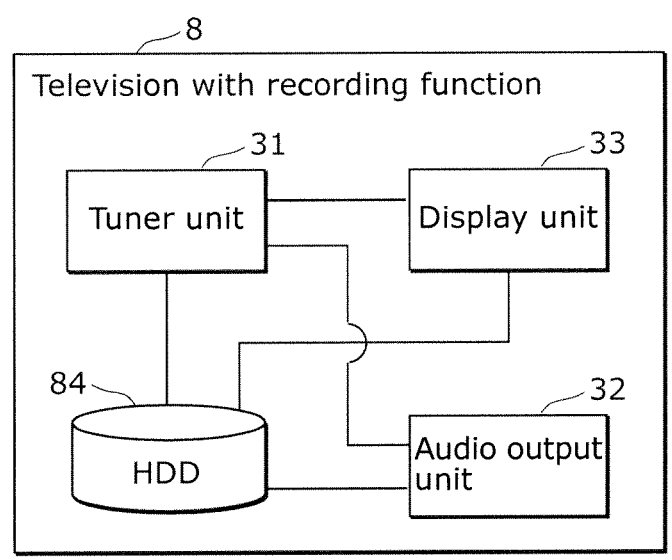
FIG. 11 is a block diagram showing a configuration of a television with a recoding function according to Embodiment 2.

FIG. 9 shows a configuration example of the program-related information providing system according to Embodiment 2. FIG. 10 is a block diagram showing a configuration of a portable terminal according to Embodiment 2. FIG. 11 is a block diagram showing a configuration of a television with a recoding function according to Embodiment 2.

The program-related information providing system (FIG. 9) according to this embodiment and the program-related information providing system (FIG. 1) described in Embodiment 1 have the following two differences. The differences are (i) the fact that the video program to be watched is a video program recorded on a television 8 with a recording function and (ii) the operation of a portable terminal 7 which occurs when a user performs a CM skip operation on the television 8 with a recording function. The other points are the same as those according to Embodiment 1 and therefore are not described here.

Here, the CM skip operation means an operation in which a CM part is fast-forwarded or skipped during playback of a recorded video program.

The program-related information providing system shown in FIG. 9 is different in structure from the program-related information providing system shown in FIG. 1 in that the television 8 with a recording function and the portable terminal 7 are provided instead of the television 3 and the portable terminal 2, respectively.

The portable terminal 7 is an example of the program information display device and includes the identification unit 21, the program information obtainment unit 22, the display unit 24, the retaining unit 25, the microphone 26, the camera 27, and a control unit 77.

The identification unit 21, the program information obtainment unit 22, the display unit 24, the retaining unit 25, the microphone 26, and the camera 27 are the same as those according to Embodiment 1 and therefore are not described here.

The control unit 77 controls the whole portable terminal 2 and also controls the whole information-related operation such as obtainment, display, etc., of the program information. Specifically, the control unit 77 has all the functions of the control unit 23 according to Embodiment 1. Furthermore, the control unit 77 controls display of the program information when an operation in which a user avoids watching the CM, such as skipping the CM in the video program played back on the television 8 with a recording function, is detected.

More specifically, the control unit 77 detects whether or not the television 8 with a recording function has skipped displaying the CM scene. When the control unit 77 detects that the television 8 with a recording function has skipped displaying the CM scene, then the control unit 77 causes the display unit 24 to continue to display the first program information (the normal content), instead of switching to the second program information (the bonus content) the program being displayed in the display unit 24.

For example, when the display of the CM scene has been skipped (when the control unit 77 detects that the television 8 with a recording function has skipped displaying the CM scene), the control unit 77 discards the second program information retained by the retaining unit 25, and causes the display unit 24 to continue to display the first program information (the normal content), instead of switching to the second program information (the bonus content) the program information being displayed in the display unit 24.

The television 8 with a recording function is an example of the video display device and includes the tuner unit 31, the audio output unit 32, the display unit 33, and a hard disk drive (HDD) 84.

The tuner unit 31, the audio output unit 32, and the display unit 33 each has the same structure as a corresponding one of those according to Embodiment 1 and therefore are not described here.

The HDD 84 is a storage medium in which the video program previously obtained by the tuner unit 31 is retained (recorded). The HDD 84 outputs information on the retained video program according to, for example, an instruction from a viewer (a user) of the television 8 with a recording function. The outputted information on the video program undergoes processing such as decoding when necessary and then is outputted from the display unit 33 and the audio output unit 32.

The program-related information providing system shown in FIG. 9 is configured as above.

[2-2. Operation]

Next, the operation of the portable terminal 7 in this embodiment is described.

Figure 12:
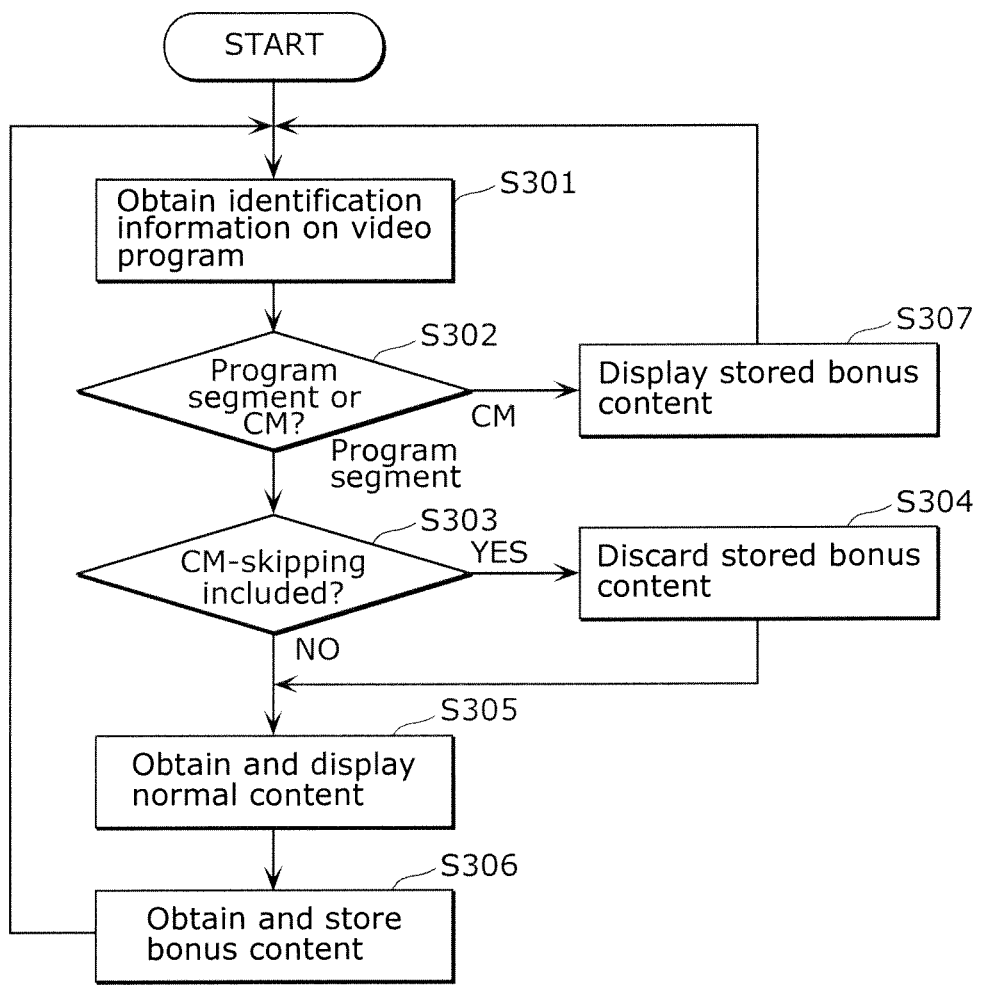
FIG. 12 is a flowchart for explaining the operation of the portable terminal according to Embodiment 2.

FIG. 12 is a flowchart for explaining the operation of the portable terminal 7 according to Embodiment 2.

The processing other than S303 and S304 is as described in Embodiment 1 and therefore is not described here. Specifically, S301 is the same processing as S201 in FIG. 7 in Embodiment 1, likewise S302, S202 in FIG. 7, S305, S203 in FIG. 7, S306, S204 in FIG. 7, and S307, S205 in FIG. 7; therefore, the processing in these steps is not described here.

When a result of S302 is the program segment, that is, when the control unit 77 determines that the scene included in the video program which is being displayed in the television 8 with a recording function is the program segment (e.g., the program segment 1), the control unit 77 detects whether or not the television 8 with a recording function has skipped displaying the CM scene (S303). This is because there is a case where a user performs the CM skip operation using remote control or the like when the program scene transitions to the CM from the program segment of the recorded video program which the user is watching on the television 8 with a recording function. Thus, after the scene included in the video program which is being displayed in the television 8 with a recording function is determined to be the program segment (e.g., the program segment 1), the control unit 77 determines whether or not the CM skip operation has been performed.

The following specifically describes a method of determining the CM skip operation.

Here, assume, for example, that the scene information includes program segment scene information indicating that the scene is of the program segment, CM scene information indicating that the scene is of the CM, and a scene identifier (ID). In addition, assume that the program segment scene information and the CM scene information are exclusively valid and that the program segment and the subsequent CM which are included in the video program have the same scene identifier in the scene information.

In this case, using the program segment scene information and the scene identifier (ID), the control unit 77 is capable of identifying, as the scene of the program segment, the scene included in the video program. Likewise, using the CM scene information and the scene identifier (ID), the control unit 77 is capable of identifying, as the CM scene, the scene included in the video program. Furthermore, even when the program segment and the subsequent CM have the same scene identifier in the scene information, the control unit 77 is capable of distinguishing the scene of the program segment from the CM scene using the program segment scene information and the CM scene information.

Thus, the control unit 77 is capable of determining the CM skip operation by checking (i) whether or not the scene ID included in the obtained scene information on the current video program and the scene ID of the immediately previously obtained scene information match each other and (ii) whether or not the CM scene information has been obtained (whether or not the CM scene has been included so far). Specifically, when confirming that the current scene ID and the immediate previous scene ID match each other and that the CM scene information has been obtained, the control unit 77 can determine that a new program segment is being played back after the CM. When confirming that the current scene ID and the immediate previous scene ID do not match each other and that the CM scene information has not been obtained, the control unit 77 can determine that the CM scene after the scene of the program segment has been skipped (not been watched).

When it is determined in S303 that the CM skip operation has been performed (YES in S303), the control unit 77 discards the bonus content (the second program information) which has been retained till then in the retaining unit 25 (S304).

On the other hand, when it is not determined in S303 that the CM skip operation has been performed (NO in S303), the potable terminal 7 proceeds to the process of S305.

Thus, when the CM skip operation has been performed on the television 8 with a recording function, the portable terminal 7 discards the bonus content (the second program information) relevant to the program segment immediate before the CM, with the result that the user becomes unable to view the bonus content (the second program information) on the portable terminal 7.

In other words, when the CM skip operation has been performed on the television 8 with a recording function, the portable terminal 7 discards the bonus content (the second program information) relevant to the program segment immediate before the CM, which makes it possible to create a situation in which a viewer of the portable terminal 7 can view the bonus content (the second program information) only when the viewer watches the CM on the television 8 with a recording function.

With this, it is possible to continue to display the CM to a viewer even when the video program transitions from a non-CM scene (a program segment) to a CM scene.

[2-3. Advantageous Effect, Etc.]

As above, in the program information display device (the portable terminal 2) according to this embodiment, the control unit (the control unit 23) is further configured to detect whether or not the video display device (the television 8 with a recording function) has skipped displaying the CM scene. The control unit (the control unit 23) is configured to, when detecting that the video display device (the television 8 with a recording function) has skipped displaying the CM scene, cause the display unit (the display unit 24) to continue to display the first program information (the normal content), instead of switching to the second program information (the bonus content) the program information (the content) being displayed in the display unit (the display unit 24).

Here, in the case where the video display device (the television 8 with a recording function) has skipped displaying the CM scene, the control unit (the control unit 23) is configured to discard the second program information (the bonus content) retained by the retaining unit (the retaining unit 25), and cause the display unit (the display unit 24) to continue to display the first program information (the normal content), instead of switching to the second program information (the bonus content) the program information (the content) being displayed in the display unit (the display unit 24).

In other words, the program information display device (the portable terminal 7) obtains the program information which corresponds to the scene of the video program. Subsequently, when the CM scene included in the video program is not displayed normally, for example, is skipped or fast-forwarded, on the video display device (the television 8 with a recording function), the program information display device (the portable terminal 7) does not display the second program information (the bonus content) which corresponds to such skipped or likewise-processed CM scene. This means that the program information display device (the portable terminal 7) displays the second program information (the bonus content) only when the video display device (the television 8 with a recording function) displays the CM scene normally. When a viewer skips the CM or performs the like operation on the CM, the program information display device (the portable terminal 7) discards the second program information (the bonus content) which was obtained originally in order to be displayed during the CM period.

By doing so, when a viewer does not watch the CM scene, it is possible to preclude provision of the second program information (the bonus content) that is to be provided only to a person who watched the CM scene. Consequently, it is possible to encourage a viewer to watch the CM scene, which produces an advantageous effect, that is, it is possible to achieve the goal, set by a program information provider or a provider of the CM scene included in the video program, that the CM scene is watched by a viewer.

In this embodiment, the operation which occurs when the recorded video program is being watched has been described, which example is intended to be illustrative and not restrictive. Even in the case of real-time broadcasting, the present inventive concept is applicable likewise. In this case, it is sufficient that, for example, the program information display device (the portable terminal 7) is configured to discard the second program information (the bonus content) when confirming a situation in which a user is not watching the CM (e.g., a user switches channels to another immediately after the transition of the program scene to the CM and then switches channels back to the previous channel when the program segment after the CM starts), that is, confirming that the scene ID has changed discretely.

Other Embodiments

As above, Embodiments 1 and 2 have been described as exemplary embodiments of the technique disclosed in the present application. However, the technique in the present disclosure is not limited to the above-described embodiments and is also applicable in embodiments obtained by making appropriate modification, replacement, addition, omission, etc., to the above-described embodiments. Furthermore, structural elements described in Embodiments 1 and 2 may be combined to provide a new embodiment.

The present disclosure includes the following case.

For example, in the description on Embodiment 2, the second program information (the bonus content) is not displayed in the case where the CM is skipped, which example is intended to be illustrative and not restrictive. Even in the case where the CM is not skipped, it may be that the second program information (the bonus content) is not displayed when the program segment has not been watched for a certain length of time. Specifically, it may be that the control unit is further configured to detect whether or not the video display device has displayed the non-CM scene for at least a predetermined length of time, and the control unit is configured to, when detecting that the video display device has not displayed the non-CM scene for at least the predetermined length of time, cause the display unit to continue to display the first program information, instead of switching to the second program information the program information being displayed in the display unit, even upon the transition of the video program scene identified by the identification information from the non-CM scene to the CM scene.

Furthermore, the description on Embodiments 1 and 2 illustrates an example in which the video display device, such as the television and the television with a recording function, is independent of the program information display device, which example is intended to be illustrative and not restrictive. For example, it may be possible to provide a program information display device in which the television 3 (the video display device) and the portable terminal 2 (the program information display device) in FIG. 1 are integrated.

In this case, specifically, the program information display device includes: an identification unit configured to obtain identification information for identifying a video program and a video program scene included in the video program; an obtainment unit configured to obtain program information including first program information and second program information which are relevant to the video program identified by the identification information and are different in content from each other; a display unit configured to display the video program and the program information obtained by the obtainment unit; and a control unit configured to, in the case where the video program scene identified by the identification information transitions from a scene other than a commercial message (a non-CM scene) to a scene of the commercial message (a CM scene), switch the program information being displayed in the display unit, from the first program information to the second program information according to the transition from the non-CM scene to the CM scene.

Furthermore, the display unit may be deleted from the portable terminal 2 (the program information display device), that is, it may also be possible to provide a program information output device which outputs the program information to the television 3 (the video display device), another display device, or the like.

In this case, specifically, the program information display device includes: an identification unit configured to obtain identification information for identifying a video program and a video program scene included in the video program, the video program and the video program scene being displayed in a video display device; an obtainment unit configured to obtain program information including first program information and second program information which are relevant to the video program identified by the identification information and are different in content from each other; an output unit configured to output the program information obtained by the obtainment unit; and a control unit configured to, in the case where the video program scene identified by the identification information transitions from a scene other than a commercial message (a non-CM scene) to a scene of the commercial message (a CM scene), switch the program information being output by the output unit, from the first program information to the second program information according to the transition from the non-CM scene to the CM scene.

The portable terminal 7 (the program information display device) shown in FIG. 10 may be a program information output device which includes a recording function of the television (the video display device) with a recording function. In this case, the program information outputted, the video of the video program, etc., can be viewed on another display device (television) or the like.

In this case, specifically, the program information display device includes: an identification unit configured to obtain identification information for identifying a video program and a video program scene included in the video program; an obtainment unit configured to obtain program information including first program information and second program information which are relevant to the video program identified by the identification information and are different in content from each other; a retaining unit configured to retain the video program and the program information; a playback unit configured to play back the video program retained by the retaining unit; an output unit configured to output the program information on the video program which is being played back by the playback unit and is identified by the identification information, the program information being obtained by the obtainment unit; and a control unit configured to, in the case where the video program scene being played back by the play back unit transitions from a scene other than a commercial message (a non-CM scene) to a scene of the commercial message (a CM scene), switch the program information being output by the output unit, from the first program information to the second program information according to the transition from the non-CM scene to the CM scene.

Furthermore, the present disclosure includes the following case.

(1) The above devices can specifically be implemented using a computer system which includes a microprocessor, a read only memory (ROM), a random access memory (RAM), a hard disk unit, a display unit, a keyboard, and a mouse, for example. The RAM or the hard disk unit stores a computer program. The microprocessor operates on the computer program, which causes each of the units to achieve a function thereof. Here, the computer program includes a combination of plural command codes indicating an instruction to the computer in order to achieve a predetermined function.

(2) Some or all of the structural elements included in each of the above devices may be included in a single system Large Scale Integration (LSI). A system LSI is an ultra-multifunction LSI manufactured with plural structural units integrated on a single chip. Specifically, the system LSI is a computer system including a microprocessor, a ROM, a RAM, and so on. The ROM stores a computer program. The microprocessor loads the computer program from the ROM to the RAM and carries out an operation or the like on the loaded computer program, which causes the system LSI to achieve a function thereof.

(3) Some or all of the structural elements included in each of the above devices may be included in an IC card or a single module detachable to and from each of the devices. The IC card or the module is a computer system which includes a microprocessor, a ROM, a RAM, and so on. The IC card or the module may also include the above ultra-multifunction LSI. The microprocessor operates on the computer program, which causes the IC card or the module to achieve a function thereof. The IC card and the module may also be tamper-resistant.

(4) One or more embodiments of the present disclosure may be implemented in the method described above. The embodiments may also be implemented using a computer program executing the method by a computer or may also be implemented using a digital signal including the computer program.

For example, software which implements the program information display device according to each of the above embodiments is the following program.

Specifically, this program causes a computer to execute: obtaining identification information for identifying a video program and a video program scene included in the video program, the video program and the video program scene being displayed in a video display device; obtaining program information including first program information and second program information which are relevant to the video program identified by the identification information and are different in content from each other; displaying, in a display unit, the program information obtained in the obtaining of program information; and switching, in the case where the video program scene identified by the identification information transitions from a scene other than a commercial message (a non-CM scene) to a scene of the commercial message (a CM scene), the program information being displayed in the display unit, from the first program information to the second program information according to the transition from the non-CM scene to the CM scene.

Furthermore, one or more embodiments of the present disclosure may be implemented using a computer-readable recording medium, such as a flexible disk, a hard disk, a CD-ROM, a Magneto-Optical disk (MO), a Digital Versatile Disc (DVD), a DVD-ROM, a DVD-RAM, a Blu-ray Disc (BD), and a semi-conductor memory, which stores the computer program or the digital signal. The one or more embodiments of the present disclosure may also be implemented using the digital signal stored in the recording medium.

In one or more embodiments of the present disclosure, the computer program or the digital signal may be transmitted via a network represented by an electronic communications line, a wireless or a wired communications line and the Internet, as well as data broadcasting, for example.

One or more embodiments of the present disclosure may be a computer system including a microprocessor and a memory. The memory may store the computer program, and the microprocessor may operate on the computer program.

The program or the digital signal may be stored in a recording medium and thus transferred or may be transferred via a network or the like so that one or more embodiments of the present disclosure is implemented by another independent computer system.

(5) The above embodiments and variations may be combined.

As above, the embodiments have been described as exemplary embodiments of the technique in the present disclosure. Accordingly, the accompanying Drawings and the detailed description have been provided.

Accordingly, in the structural elements stated in the accompanying Drawings and the detailed description, not only structural elements indispensable to solving the problems, but also structural elements not indispensable to solving the problems can be included in order to exemplify the above technique. It should therefore not be construed that those structural elements not indispensable are indispensable just because those structural elements not indispensable are stated in the accompanying Drawings and the detailed description.

In addition, since the above-described embodiments are intended to exemplify the technique in the present disclosure, various modification, replacement, addition, omission, etc., may be possible within the literal and equivalent scope of the CLAIMS.

INDUSTRIAL APPLICABILITY

A program information display device according to one or more exemplary embodiments disclosed herein is applicable to a program information display device that displays, on a portable terminal or a television, information related to a television program which is being watched.

The invention claimed is:

1. A program information display device comprising:
an identification unit configured to obtain identification information for identifying a video program and a video program scene included in the video program, the video program and the video program scene being displayed in a video display device;
an obtainment unit configured to obtain program information including first program information and second program information which are relevant to the video program identified by the identification information and are different in content from each other;
a display unit configured to display the program information obtained by the obtainment unit; and
a control unit configured to, in the case where the video program scene identified by the identification information transitions from a scene other than a commercial message (a non-CM scene) to a scene of the commercial message (a CM scene), switch the program information being displayed in the display unit, from the first program information to the second program information according to the transition from the non-CM scene to the CM scene.

2. The program information display device according to claim 1,
wherein, in the case where the video program scene identified by the identification information transitions from the non-CM scene to the CM scene, the control unit is configured to switch the program information being displayed in the display unit, from the first program information to the second program information immediately after the transition from the non-CM scene to the CM scene.

3. The program information display device according to claim 1,
wherein, in the case where the video program scene identified by the identification information transitions from the non-CM scene to the CM scene, the control unit is configured to switch the program information being displayed in the display unit, from the first program information to the second program information immediately before the transition from the non-CM scene to the CM scene.

4. The program information display device according to claim 1,
wherein, in the case where the video program scene identified by the identification information transitions from the CM scene to the non-CM scene, the control unit is further configured to switch the program information being displayed in the display unit, from the second program information to the first program information according to the transition from the CM scene to the non-CM scene.

5. The program information display device according to claim 4,
wherein, in the case where the video program scene identified by the identification information transitions from the CM scene to the non-CM scene, the control unit is configured to switch the program information being displayed in the display unit, from the second program information to the first program information immediately after the transition from the CM scene to the non-CM scene.

6. The program information display device according to claim 4,
wherein, in the case where the video program scene identified by the identification information transitions from the CM scene to the non-CM scene, the control unit is configured to switch the program information being displayed in the display unit, from the second program information to the first program information immediately before the transition from the CM scene to the non-CM scene.

7. The program information display device according to claim 1,
wherein the control unit is further configured to detect whether or not the video display device has skipped displaying the CM scene, and
the control unit is configured to, when detecting that the video display device has skipped displaying the CM scene, cause the display unit to continue to display the first program information, instead of switching to the second program information the program information being displayed in the display unit.

8. The program information display device according to claim 1, further comprising
a retaining unit configured to retain at least the second program information,
wherein the obtainment unit is configured to obtain the program information including the second program information and cause the retaining unit to retain the obtained second program information before the CM scene included in the video program is displayed in the video display device, and
the control unit is configured to switch, according to the transition from the non-CM scene to the CM scene, the program information being displayed in the display unit, from the first program information to the second program information retained by the retaining unit.

9. The program information display device according to claim 1,
wherein the obtainment unit is configured to obtain the program information including the second program information when the video display device displays the CM scene included in the video program, and
the control unit is configured to switch, according to the transition from the non-CM scene to the CM scene, the program information being displayed in the display unit, from the first program information to the second program information obtained by the obtainment unit.

10. The program information display device according to claim 8,
wherein, in the case where the video display device has skipped displaying the CM scene, the control unit is configured to discard the second program information retained by the retaining unit, and cause the display unit to continue to display the first program information, instead of switching to the second program information the program information being displayed in the display unit.

11. The program information display device according to claim 1,
wherein the control unit is further configured to detect whether or not the video display device has displayed the non-CM scene for at least a predetermined length of time, and
the control unit is configured to, when detecting that the video display device has not displayed the non-CM scene for at least the predetermined length of time, cause the display unit to continue to display the first program information, instead of switching to the second program information the program information being displayed in the display unit, even upon the transition of the video program scene identified by the identification information from the non-CM scene to the CM scene.

12. The program information display device according to claim 1,
wherein the video program includes the non-CM scene and the CM scene, and
the non-CM scene is a scene of a program segment included in the video program.

13. The program information display device according to claim 1,
wherein the first program information is program information related to program content of the non-CM scene included in the video program, and
the second program information is program information which is related to content of the non-CM scene included in the video program and is displayed in the display unit for an interval during which the CM scene included in the video program is displayed in the video display device.

14. A program information display device comprising:
an identification unit configured to obtain identification information for identifying a video program and a video program scene included in the video program;
an obtainment unit configured to obtain program information including first program information and second program information which are relevant to the video program identified by the identification information and are different in content from each other;
a display unit configured to display the video program and the program information obtained by the obtainment unit; and a control unit configured to, in the case where the video program scene identified by the identification information transitions from a scene other than a commercial message (a non-CM scene) to a scene of the commercial message (a CM scene), switch the program information being displayed in the display unit, from the first program information to the second program information according to the transition from the non-CM scene to the CM scene.

15. A program information output device comprising:
an identification unit configured to obtain identification information for identifying a video program and a video program scene included in the video program;
an obtainment unit configured to obtain program information including first program information and second program information which are relevant to the video program identified by the identification information and are different in content from each other;
a retaining unit configured to retain the video program and the program information;
a playback unit configured to play back the video program retained by the retaining unit;
an output unit configured to output the program information on the video program which is being played back by the playback unit and is identified by the identification information, the program information being obtained by the obtainment unit; and
a control unit configured to, in the case where the video program scene being played back by the play back unit transitions from a scene other than a commercial message (a non-CM scene) to a scene of the commercial message (a CM scene), switch the program information being output by the output unit, from the first program information to the second program information according to the transition from the non-CM scene to the CM scene.

16. A program information output device comprising:
an identification unit configured to obtain identification information for identifying a video program and a video program scene included in the video program, the video program and the video program scene being displayed in a video display device;
an obtainment unit configured to obtain program information including first program information and second program information which are relevant to the video program identified by the identification information and are different in content from each other;
an output unit configured to output the program information obtained by the obtainment unit; and
a control unit configured to, in the case where the video program scene identified by the identification information transitions from a scene other than a commercial message (a non-CM scene) to a scene of the commercial message (a CM scene), switch the program information being output by the output unit, from the first program information to the second program information according to the transition from the non-CM scene to the CM scene.

17. A program information display method comprising:
obtaining identification information for identifying a video program and a video program scene included in the video program, the video program and the video program scene being displayed in a video display device;
obtaining program information including first program information and second program information which are relevant to the video program identified by the identification information and are different in content from each other;
displaying, in a display unit, the program information obtained in the obtaining of program information; and
switching, in the case where the video program scene identified by the identification information transitions from a scene other than a commercial message (a non-CM scene) to a scene of the commercial message (a CM scene), the program information being displayed in the display unit, from the first program information to the second program information according to the transition from the non-CM scene to the CM scene.

18. A non-transitory computer-readable recording medium for use in a computer, the recording medium having a program recorded thereon for causing the computer to execute a program information method comprising:
obtaining identification information for identifying a video program and a video program scene included in the video program, the video program and the video program scene being displayed in a video display device;
obtaining program information including first program information and second program information which are relevant to the video program identified by the identification information and are different in content from each other;
displaying, in a display unit, the program information obtained in the obtaining of program information; and
switching, in the case where the video program scene identified by the identification information transitions from a scene other than a commercial message (a non-CM scene) to a scene of the commercial message (a CM scene), the program information being displayed in the display unit, from the first program information to the second program information according to the transition from the non-CM scene to the CM scene.

* * * * *